United States Patent [19]

Dorsey

[11] 4,373,779
[45] Feb. 15, 1983

[54] SINGLE CHANNEL OPTICAL SLIP RING

[75] Inventor: Glenn F. Dorsey, Blacksburg, Va.

[73] Assignee: Litton Systems, Inc., Blacksburg, Va.

[21] Appl. No.: 204,763

[22] Filed: Nov. 7, 1980

[51] Int. Cl.³ ............................................ G02B 5/14
[52] U.S. Cl. ................................................ 350/96.21
[58] Field of Search .............. 350/96.20, 96.21, 96.22

[56] References Cited

U.S. PATENT DOCUMENTS

| | | | |
|---|---|---|---|
| 3,922,063 | 11/1975 | Marrone | 350/96 |
| 4,027,945 | 6/1977 | Iverson | 350/96 |
| 4,124,272 | 11/1978 | Henderson et al. | 350/96.2 |
| 4,325,607 | 4/1982 | Carlsen | 350/96.2 |

*Primary Examiner*—Eli Lieberman
*Attorney, Agent, or Firm*—Brian L. Ribando

[57] ABSTRACT

A single channel optical slip ring assembly comprising a hollow rotor shaft selectively dimensioned for receiving a fiber optic cable, a rotor bushing mounted in the rotor shaft and having an axial bore for receiving an optic fiber of a fiber optic cable, a stator cylindrical member selectively dimensioned for receiving a fiber optic cable, and having on one end an axially extending collar, a stator bushing mounted within the stator proximate the collar having an axial bore for receiving an optic fiber in each end thereof, means for rotatably mounting the bushing end of the rotor shaft within the collar of the stator cylindrical member so that the rotor bushing bore and the stator bushing bore are aligned along the axis of rotation and the bushings are separated by a selected gap, a gauging bore in the stator bushing which orthogonally intersects its axial bore, means in the stator cylindrical member for permitting access to the gauging bore, a stator fiber optic cable in the stator cylindrical member having an exposed length of optic fiber extending into the stator bushing bore to a selected gauged location within the gauging bore, and a rotor fiber optic cable in the rotor shaft having an exposed length of optic fiber passing through the rotor bushing bore, across the gap, and into the stator bushing bore to a selected gauged location spaced from the stator optic fiber within the gauging bore, whereby the rotor optic fiber rotates within the stator bushing and the fiber ends are maintained spaced from one another and in axial alignment thereby.

2 Claims, 1 Drawing Figure

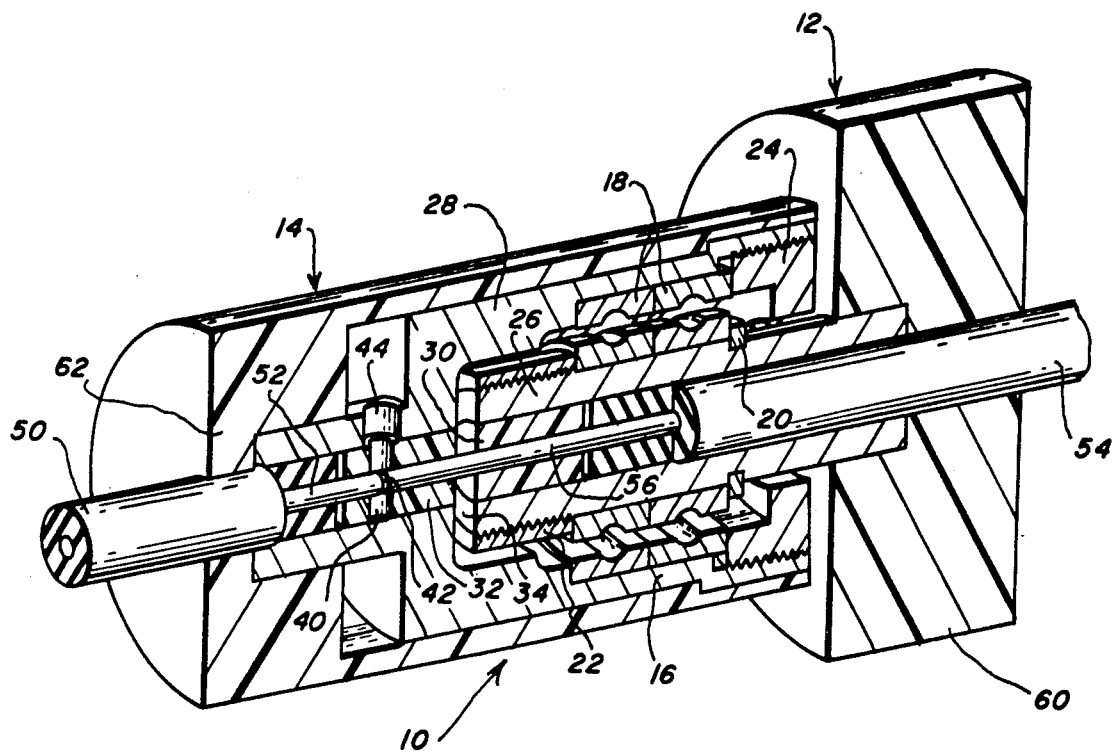

SINGLE CHANNEL OPTICAL SLIP RING

The present invention relates to single channel optical slip rings.

It is well known to optically couple two fixed fiber optic cables, each having a single optic fiber, by maintaining the ends of the fibers proximate and in axial alignment. It would be highly advantageous to provide an optical joint which would allow for relative rotation between the two cables.

An object of this invention is to provide a single channel fiber optic rotary joint.

Other objects and advantages of the present invention will become apparent from the following portion of this specification and from the accompanying drawing which illustrates, in accordance with the mandate of the patent statutes, a presently preferred embodiment incorporating the principles of the invention.

The sole FIGURE is a perspective view in partial section of a single channel fiber optic rotary joint according to the teachings of the present invention.

The fiber optic rotary joint or optical slip ring 10 generally includes a rotor assembly 12 and a stator assembly 14 for maintaining two fiber optic cables axially aligned during relative rotation thereof. The rotor assembly 12 is mounted within an axially extending collar 16 of the stator assembly 14 by a pair of pre-loaded bearings 18 which are secured to the rotor by a retaining ring 20 and associated nut 22 and which are maintained with the stator collar 16 by a second bearing nut 24.

The rotor includes a hollow shaft 16 and the stator includes a cylindrical member 28 each having an axial bore for receiving the respective fiber optic cables 54 and 50. Bushings 30 and 32 are mounted within the respective adjacent ends of the rotor and stator bores and are separated by a selected bushing gap 34. Each bushing has an axial bore selectively sized for receiving an optic fiber. The stator bushing 32 additionally has a gauging bore 40 which orthogonally intersects its axial bore defining a gauging area 42. An aperture 44 in the stator assembly 14 provides access to the gauging bore within the stator bushing for a gauging tool or other conventional gauging means.

A first fiber optic cable 50 is secured with an adhesive or other conventional means in the stator bore and has an exposed length of optic fiber 52 which extends into the stator bushing 32 to a selected gauged location within the gauging area 42. A second fiber optic cable 54 is secured in the rotor bore and has an exposed length of optic fiber 56 passing through the rotor bushing 30, across the bushing gap 34, and into the stator bushing 32 to a selected gauged location within the gauging area 42 without contacting the first optic fiber 52 and preferably leaving a 1 mil gap between the fibers. Rotation of the rotor assembly 12 rotates the rotor optic fiber 56 within the stator bushing 32 which maintains the axial alignment of the fiber ends thereby optically coupling the cables.

In the preferred embodiment, the bushings 30 and 32 are made from an anti-friction material, such as Teflon ®, for preventing wear to the rotor optic fiber 56. Also, the rotor assembly 12 includes a flanged end 60 which provides a suitable mounting base and the stator assembly 14 includes a plastic sheath 62 which covers the access aperture 44 and prevents dirt from getting into the gauging bore 40.

What is claimed is:

1. A single channel optical slip ring assembly comprising:
    a hollow rotor shaft selectively dimensioned for receiving a fiber optic cable,
    a rotor bushing mounted in said rotor shaft and having an axial bore for receiving an optic fiber of a fiber optic cable,
    a stator cylindrical member selectively dimensioned for receiving a fiber optic cable, and having on one end an axially extending collar,
    a stator bushing mounted within said stator proximate said collar having an axial bore for receiving an optic fiber in each end thereof,
    means for rotatably mounting said bushing end of said rotor shaft within said collar of said stator cylindrical member so that said rotor bushing bore and said stator bushing bore are aligned along the axis of rotation and said bushings are separated by a selected gap,
    a gauging bore in the stator bushing which orthogonally intersects its axial bore,
    means in said stator cylindrical member for permitting access to said gauging bore,
    a stator fiber optic cable in said stator cylindrical member having an exposed length of optic fiber extending into said stator bushing bore to a selected gauged location within said gauging bore, and
    a rotor fiber optic cable in said rotor shaft having an exposed length of optic fiber passing through said rotor bushing bore, across said gap, and into said stator bushing bore to a selected gauged location spaced from said stator optic fiber within said gauging bore, whereby the rotor optic fiber rotates within said stator bushing and the fiber ends are maintained spaced from one another and in axial alignment thereby.

2. A single channel optical slip ring assembly according to claim 1 wherein said bushings are comprised of an anti-friction material for preventing wear to the exposed length of optic fiber of said rotor optic cable during rotation of said rotor shaft.

* * * * *